US012385283B2

(12) United States Patent
McLoughlin et al.

(10) Patent No.: US 12,385,283 B2
(45) Date of Patent: Aug. 12, 2025

(54) LOCKING DEVICE

(71) Applicant: UAP Limited, Whitefield (GB)

(72) Inventors: John McLoughlin, Manchester (GB); David Jennings, Manchester (GB)

(73) Assignee: UAP Limited, Whitefield (GB)

( * ) Notice: Subject to any disclaimer, the term of this patent is extended or adjusted under 35 U.S.C. 154(b) by 126 days.

(21) Appl. No.: 18/043,932

(22) PCT Filed: May 27, 2021

(86) PCT No.: PCT/EP2021/064247
§ 371 (c)(1),
(2) Date: Mar. 3, 2023

(87) PCT Pub. No.: WO2022/048801
PCT Pub. Date: Mar. 10, 2022

(65) Prior Publication Data

US 2023/0313561 A1 Oct. 5, 2023

(30) Foreign Application Priority Data

Sep. 4, 2020 (GB) ..................................... 2013948

(51) Int. Cl.
*E05B 17/20* (2006.01)
*E05B 47/00* (2006.01)
(Continued)

(52) U.S. Cl.
CPC ...... *E05B 17/2026* (2013.01); *E05B 17/2038* (2013.01); *E05B 47/0012* (2013.01);
(Continued)

(58) Field of Classification Search
CPC ........... Y10T 292/0977; Y10T 292/098; Y10T 292/1021; E05B 2047/0048;
(Continued)

(56) References Cited

U.S. PATENT DOCUMENTS

2019/0003206 A1* 1/2019 Sanford ............. G07C 9/00182
2022/0034126 A1* 2/2022 Zhao ....................... E05B 63/08

FOREIGN PATENT DOCUMENTS

EP 0668425 A1 * 8/1995
EP 2392752 A2 * 12/2011 ............. E05B 17/22
WO WO-2017024088 A1 * 2/2017 ............. E05B 47/00

* cited by examiner

*Primary Examiner* — Christine M Mills
*Assistant Examiner* — Yahya Sidky
(74) *Attorney, Agent, or Firm* — Woodard, Emhardt, Henry, Reeves & Wagner, LLP

(57) ABSTRACT

The present invention relates to a locking device 1 having a deadbolt 104 within a casing 102, which deadbolt 104 is movable between an advanced position wherein it protrudes from a front face of the casing 102 and a retreated position, wherein it is retracted into the casing 102. The locking device 1 comprises: a link plate 130 which moves the deadbolt 104 to the advanced position; a deadbolt blocking member 110 which is moveable between a blocking position blocking the deadbolt 104 in the advanced position and an unblocking position to allow the deadbolt 104 to move to the retreated position; an electrically driven actuator unit 120 which moves the deadbolt blocking member 110 between the blocking position and the unblocking position; and a control circuit configured to control the electrically driven actuator unit 120 so that once the deadbolt 104 is moved to the advanced position, the deadbolt blocking member 110 is moved to the blocking position by actuation of the electrically driven actuator unit 120.

18 Claims, 13 Drawing Sheets

(51) Int. Cl.
*E05B 47/06* (2006.01)
*E05C 9/02* (2006.01)

(52) U.S. Cl.
CPC .......... *E05B 47/0603* (2013.01); *E05C 9/021* (2013.01); *E05B 2047/0069* (2013.01); *E05B 2047/0084* (2013.01)

(58) Field of Classification Search
CPC ..... E05B 2047/0067; E05B 2047/0069; E05B 2047/0084; E05B 47/0603; E05B 47/0012; E05B 17/2026; E05B 17/2038; E05C 9/021
See application file for complete search history.

LOCKING DEVICE

FIELD

This invention relates to a locking device for door or window. More specifically, this invention is directed to a locking device activated by means of electric current.

BACKGROUND ART

Electronic locks are becoming more common in door locks for homes or facilities because these locks offer a number of advantages over traditional mechanical door locks in both convenience and improved security. In particular, typical electronic locks use push-buttons or a keypad to enter a series of numbers or password for authentication. Users do not have to carry keys and worry about losing keys. Some electronic locks are even able to grant or deny access remotely via users' devices such as smart phones. These locks, in fact, allow exclusive access only to authorised people who have been given their own fob device, magnet card or the like, or who have been informed of the numeric code to be entered to the keypad. In addition, some electronic locks have an access record function to record when and who accesses and operates the lock. In some cases, such information is sent to an administrator or security services, with user consent, to track usage and also to monitor and adjust access rights.

The electronic locks also have some drawbacks. The most striking problem for those powered with a battery, is linked to the possibility of not being able to open the door when the battery is low. Even in an electric lock that is directly powered by an external power source, an internal battery may be still necessary in case of a power failure at the home or facility.

Particularly, in an electronic lock as disclosed in U.S. Pat. No. 6,035,676, wherein a deadbolt is directly moved by actuation of an electric actuator, such a problem would be critical because large torque is required to move the deadbolt forward and backward against relatively high frictional loads, and a larger amount of electric power is thus required to drive the actuator, which leads to a rapid decrease in the remaining battery level. This particularly holds true in a multipoint locking system.

Moreover, conventional electric locks are expensive, not least due to the fact that they require large motors.

SUMMARY

It is an object of the invention, therefore, to provide a locking device capable of locking and unlocking a door, or the like, in an electric manner with a low power consumption. Further objects and advantages of the present invention will be apparent from the detailed description as below.

According to the present invention there is provided a locking device having a deadbolt within a casing, which deadbolt is movable between an advanced position wherein it protrudes from a front face of the casing and a retreated position wherein it is retracted into the casing, and comprising: a link plate which moves the deadbolt to the advanced position; a deadbolt blocking member which is movable between a blocking position blocking the deadbolt in the advanced position and an unblocking position to allow the deadbolt to move to the retreated position; an electrically driven actuator unit which moves the deadbolt blocking member between the blocking position and the unblocking position; and a control circuit configured to control the electrically driven actuator unit so that that once the deadbolt is moved to the advanced positon, the deadbolt blocking member is moved to the blocking position by actuation of the electrically driven actuator unit.

The present invention is based on the idea that, instead of electrically moving a deadbolt against the relatively high frictional loads, a deadbolt blocking member, which may be less frictional than the deadbolt, is provided and electrically actuated to lock a door or the like.

The initial locking action may be initiated either by lifting or lowering a door handle or the like, or by a mechanical power accumulating unit as described later, to move the link plate. This movement of the link plate advances the deadbolt into a corresponding cavity in a door frame to lock the door. The control circuit then controls the electrically driven actuator unit so that once the deadbolt is moved to the advanced position, the deadbolt blocking member is moved to the blocking position, whereby the retracting movement of the deadbolt is prevented. Unblocking of the deadbolt may be performed by a reverse operation of the blocking operation.

In this way, the electrically driven actuator unit is not used to move the deadbolt that produces relatively higher frictional loads, but instead only activates the deadbolt blocking member which may be less frictional than the deadbolt. Accordingly, the required output torque of the electrically driven actuator unit can be reduced. This allows the use of an electrically driven actuator unit with a low power consumption.

The deadbolt blocking member may have any physical structure, as long as is is able to prevent the retracting movement of the deadbolt. For example, the deadbolt blocking member may be a pin that projects and retracts by a solenoid. However, as will be described later, in embodiments incorporating a manual override mechanism, it is preferable that the deadbolt blocking member has a structure suitable for the manual operation as well. Another consideration that may need to be considered is the strength of the deadbolt blocking member. It is preferable that the deadbolt blocking member has a strength and resilience to withstand a potential burglary by force. A pin may not be enough strong for this purpose.

In a preferred embodiment, the locking device further comprises a first detector which is configured to detect whether the deadbolt is in the advanced position. In such a case, the control circuit is configured to move the deadbolt blocking member by actuation of the electrically driven actuator unit when the first detector detects the deadbolt is in the advanced positon. The door handle operation, or the actuation of the mechanical power accumulating unit as described later, triggers the electrically driven actuator unit to move the deadbolt blocking member toward the blocking position. In this embodiment, the blocking of the deadbolt is automatically performed upon the detection by the first detector. In addition, an inappropriate blocking operation is prevented. More specifically, if the deadbolt blocking member is moved to the blocking position in spite of the deadbolt still being in the retracted position, the electrically driven actuator unit may be overloaded and generate heat. Such a scenario is prevented by the control circuit associated with the first detector.

In a preferred embodiment, the locking device further comprises a second detector which is configured to detect whether the deadbolt blocking member is in the blocking position. In such a case, the control circuit is configured to stop actuation of the electrically driven actuator unit after moving the deadbolt blocking member from the unblocking position to the blocking position. In this embodiment, overload of the electrically driven actuator unit after moving the deadbolt blocking member from the unblocking position to the blocking position is prevented by the control circuit associated with the second detector.

In a preferred embodiment, the locking device further comprises a third detector which is configured to detect whether the deadbolt blocking member is in the unblocking position. In such a case, the control circuit is configured to stop actuation of the electrically driven actuator unit after moving the deadbolt blocking member from the blocking position to the unblocking position. In this embodiment, overload of the electrically driven actuator unit after moving the deadbolt blocking member from the blocking position to the unblocking position is prevented by the control circuit associated with the third detector.

In the embodiments having the first, second, and/or third detectors, it is preferable that at least one of these detector is a non-contact sensor. Examples of the non-contact sensor include a proximity sensor such as a Hall effect sensor or an electrostatic capacitance sensor or a photoelectric sensor. A Hall effect sensor is preferred as it does not deteriorate with dust, oil, lock shavings, etc. Also, Hall effect sensors are accurate, sensitive and function with accurate position measurement over a long period of time. Hence, a Hall effect sensor is the most suitable for use within the locking device, among other non-contact sensors. The detector is not however limited to a non-contact sensor. The detector may be a mechanical sensor such as a limit switch or a microswitch.

In a preferred embodiment, the locking device further comprises a mechanical power accumulating unit which accumulates energy and releases a force to move the link plate so that the deadbolt is moved in association with the movement of the link plate. The mechanical power accumulating unit and the link plate may be directly connected. In such a case, the mechanical power accumulating unit may be located near the deadbolt. Alternatively, the mechanical power accumulating unit and the link plate may be connected via a connecting rod in a torque-transmittable manner, in the direction of a longitudinal axis of a face plate of the locking device.

According to this embodiment, the deadbolt is driven to the advanced position, similar to a conventional electric lock in which the deadbolt is moved by an electric actuator. It should be noted, however, that the locking device of the present invention does not consume any electric power to drive the deadbolt.

To this end, the mechanical power accumulating unit may include a spring to releasably accumulate the energy. In general, metallic springs are more reliable than elastic materials such as rubber, especially in long-term use. The spring accumulates energy as it is compressed and dissipates it to move the deadbolt to the locking position. Additionally, or alternatively, the repulsive force of a pair of magnets may be used to move the deadbolt to the locking position.

Preferably, the link plate is configured to convert the force released by the mechanical power accumulating unit into the advancing movement of the deadbolt to the advanced position. To this end, the link plate may include a cam groove, and the deadbolt may include a follower pin which moves along, and with respect to, the cam groove. Two or more sets of the cam groove and the follower pin may be provided.

Preferably, the locking device comprises an operation part that moves the link plate against the mechanical power accumulating unit to accumulate energy. The operation part may be configured to be driven in association with the movement of the door handle or the like by a user. Preferably, the operation part may be fitted to a spindle of the door handle or the like. The operation part may include a radial groove, and the link plate may include a pin which is received in the radial groove. Accordingly, the operation part rotates by lifting or lowering the door handle, the rotation is converted into a linear movement of the link plate via the engagement of the radial groove and the pin.

Preferably, the mechanical power accumulating unit includes a holding mechanism that releasably holds the spring in a compressed state after the spring has been compressed by operation of the operation part. This ensures that the compression force of the spring can be accumulated within the spring until the door is closed, for example.

Specifically, the holding mechanism may include a connecting plate that directly, or indirectly, connects the spring to the link plate, and a strike pin that engages the connecting plate to hold the compressed state of the spring. The strike pin is configured to be moveable out of engagement with the connecting plate so that the mechanical power accumulating unit directly, or indirectly, moves the link plate. Preferably, the strike pin is spring-loaded toward a door frame side and projects over the face plate of the locking device. According to this configuration, when the door leaf with the locking device is closed, the door frame pushes the strike pin to disengage the connecting plate from the strike pin, allowing the connecting plate to move by means of the spring. This movement of the connecting plate is then transmitted to the link plate, and the deadbolt is advanced toward the corresponding cavity of the door frame, as described above. The 'auto-lock' function is thus provided by the cooperation of the mechanical power accumulating unit and the electrically driven actuator unit.

In a preferred embodiment, in the blocking position the deadbolt blocking member is positioned immediately behind the deadbolt but with a gap there-between. The gap is provided between the rear surface of the deadbolt and the deadbolt blocking member in the blocking position. This ensures that the deadbolt blocking member does not come into contact with the deadbolt when it moves to block the deadbolt, allowing the deadbolt blocking member to move free from friction against the deadbolt during the movement of the deadbolt blocking member. The required power output of the electrically driven actuator unit is thus further reduced.

Another aspect of the invention is directed to a manual override function. The manual override function may be necessary to ensure that the door may always be manually unlocked from the indoor side and/or outdoor side. The manual override function is for unlocking directly, perhaps even without requiring actuation of the electrically driven actuator unit in the locking device, but by actuation of a mechanical override mechanism alone. Installation of such a manual override function may be required by law or regulation, in some countries or regions.

The deadbolt blocking member in a preferred embodiment therefore includes: a first slider movable by actuation of the electrically driven actuator unit; a second slider slidably attached to the first slider; a biasing member that applies a biasing force between the first slider and the second slider so that the second member moves to the blocking position together with the first slider during actuation of the electrically driven actuator unit; and a manual override mechanism for manually moving the second slider with respect to the first slider to the unblocking position against the biasing force of the biasing member. In the operation of the manual override mechanism, the second slider can move with respect to the first slider in an isolated manner, allowing a means of activating the manual override mechanism without transmitting torque to the electrically driven actuator unit. This ensures that the manual override mechanism is readily operated without undue manual force being required.

In a preferred embodiment, the manual override mechanism includes a rack formed on the second slider, and a pinion which is driven by a manual operation key and engages with the rack to move the second slider with respect to the first slider. The manual operation key used to manually unlock the locking device from the outdoor side may be a high security key suitable for a high security lock cylinder or the like which is connected to the pinion, whereas the manual operation key used to manually unlock the locking device from the indoor side may be a simple pinon wheel key with any profile that can transmit the rotational torque from the pinon wheel key to the pinion, such as with star shape, square shape, or trapezoidal shape. Alternatively, the indoor side operation key may be a thumb-turn grip or the like which is connected to the pinion to drive.

Another aspect of the invention is directed to a power feed structure that can also be incorporated into existing doors. It is not always easy to directly supply electric power from an external power source to the locking device via an electric wire. The locking device of a preferred embodiment therefore includes a rechargeable battery configured to provide electrical power to the control circuit; and an induction coil coupled to the rechargeable battery. The induction coil is configured to wirelessly receive power from an external device that is positioned proximate to the locking device. To this end, a transmitting induction coil may be arranged in or on the door frame, and the receiving induction coil connected to the rechargeable battery via the control circuit may be arranged in or on a face plate of the locking device, so as to face the transmitting induction coil, so that the rechargeable battery is charged while the door is closed. In this regard, the control circuit may be configured to monitor the residual capacity of the rechargeable battery and send the information thereof to a user's device such as a remote control and smart phone.

The locking device of a preferred embodiment further comprises an operation pad connected to the control circuit by a wireless or wired channel including at least two separated buttons. The operation pad may be arranged on an indoor side and/or outdoor side of a door. The control circuit is configured to actuate the electrically driven actuator unit to move the deadbolt blocking member to the unblocking position when the at least two buttons are pressed simultaneously. This provides adequate security particularly against unwanted child operation for the internal opening operation more than just a single press of a single button.

Finally, the locking device may be a multi-point locking device which comprises one or more auxiliary locks at multiple points. The present invention is not limited thereto, and the locking device may be a single-point lock having at least one of the aforementioned aspects.

BRIEF DESCRIPTION OF THE DRAWINGS

The principle of the invention will now be more fully described by way of example with reference to the accompanying drawings, in which.

DETAILED DESCRIPTION

Figure 1:
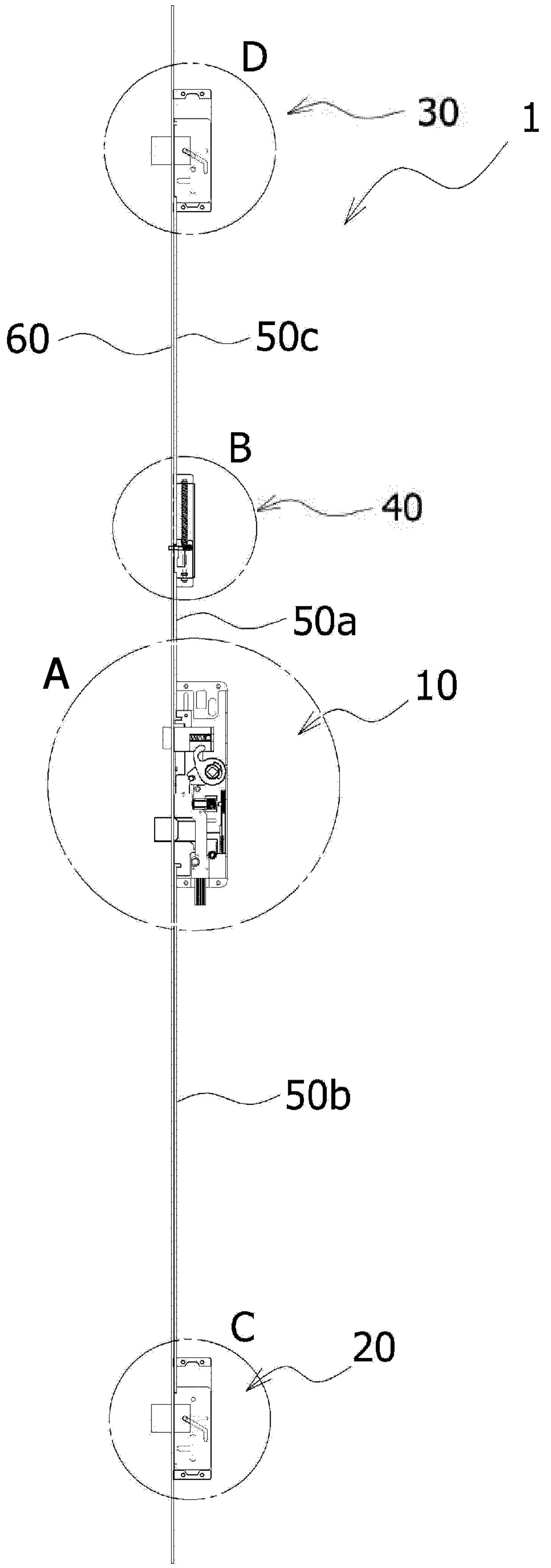
FIG. 1 is a side view of a locking device, with side covers removed for making inside visible, according to an embodiment of the present invention.

FIG. 1 is a side view showing an overview of an example of a locking device 1 according to an embodiment of the present invention. The locking device 1 is for locking a closure such as a door, a window, or the like. This exemplary device is a multi-point lock with not only a main lock 10 but also one or more auxiliary locks 20, 30. The present invention, however, is not limited thereto and may be a single-point lock with only the main lock 10 provided. FIG. 1 also shows a mechanical power accumulating unit 40 for automatically locking or at least assisting the locking.

Figure 2:
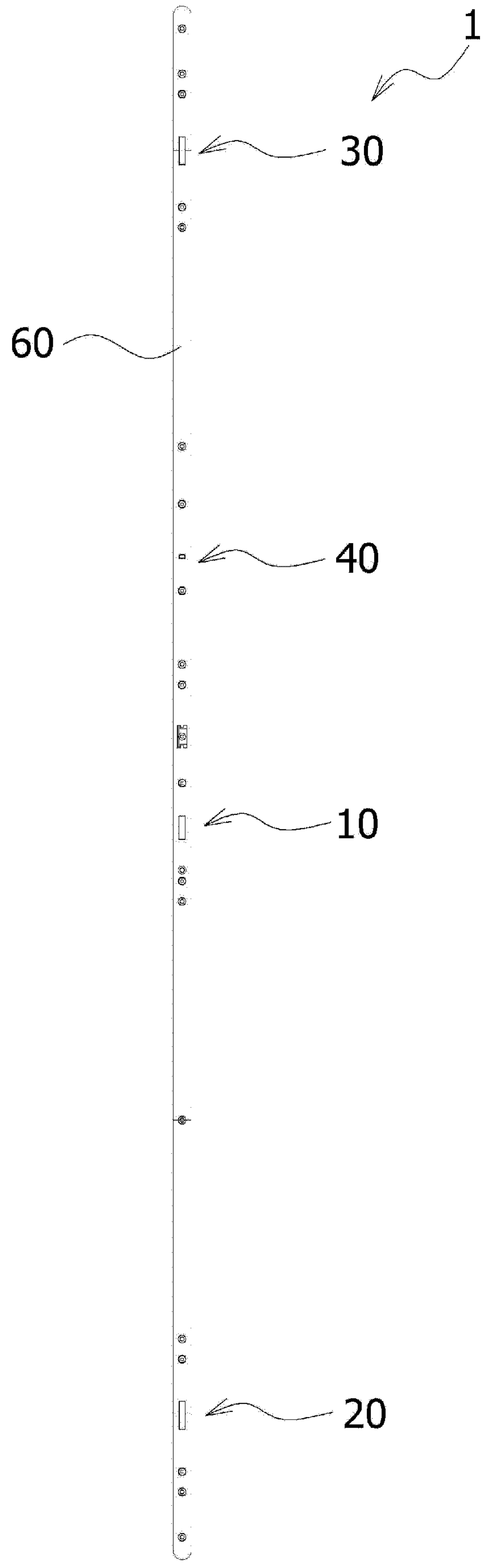
FIG. 2 is a front view showing a face plate of the looking device of FIG. 1.

The mechanical power accumulating unit 40 and the main lock 10, the main lock 10 and the auxiliary lock 20, as well as the mechanical power accumulating unit 40 and the auxiliary lock 30 are respectively connected to each other via a connecting rod 50*a*, 50*b*, 50*c*. Each connecting rods 50*a*, 50*b*, 50*c* is movable along and with respect to a face plate 60 to which the locks 10, 20, 30 and mechanical power accumulating unit 40 are fixed by means of screws or the like. Such screws can be seen in FIG. 2.

These locks 10, 20, 30 and mechanical power accumulating unit 40 will be placed in pockets formed in the front face of a door leaf facing a door frame, and fixed thereto via the face plate 60.

Figure 3:
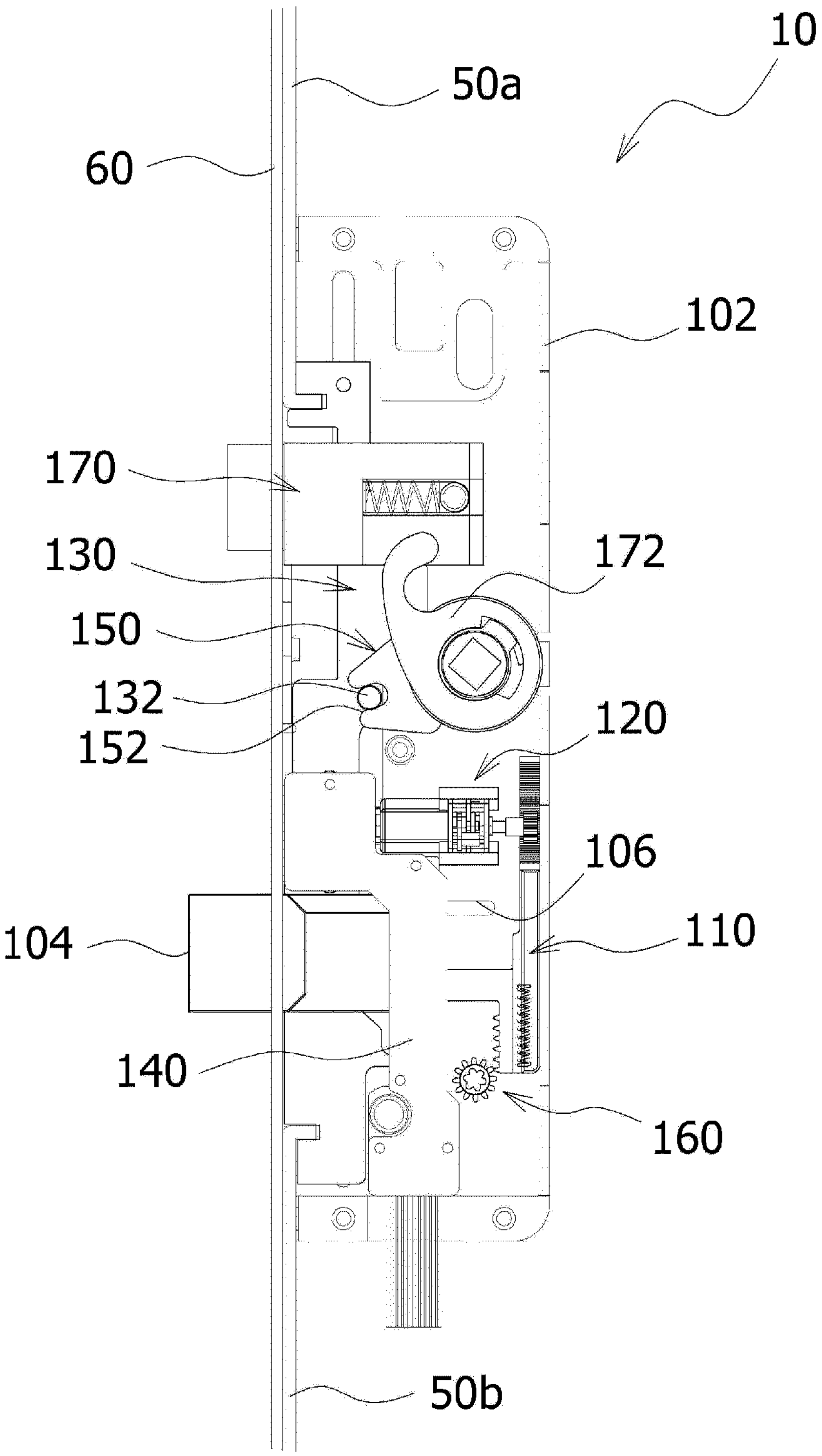
FIG. 3 is an enlarged view of a main lock as encompassed by circle A in FIG. 1.

Referring to FIG. 3, the main lock 10 is shown with a side cover removed for making the inside of a casing 102 visible. The main lock 10 includes a deadbolt 104, a deadbolt blocking member 110, an electrically driven actuator unit 120, a link plate 130, and a printed circuit board (PCB) 140 on which a control circuit is mounted.

The main lock 10 may further include an operation part 150, a manual override mechanism 160 and a latch assembly 170.

The deadbolt 104 is arranged so as to be movable between an advanced position wherein it protrudes from the front face of the casing 102 and a retreated position wherein it is retracted into the casing 102. The deadbolt 104 may engage with a cavity formed in the door frame in the advanced position to lock the door leaf with respect to the door frame. One or more guides 106 in the form of groove for guiding the deadbolt 104 may be provided in the casing 102.

Figure 4:
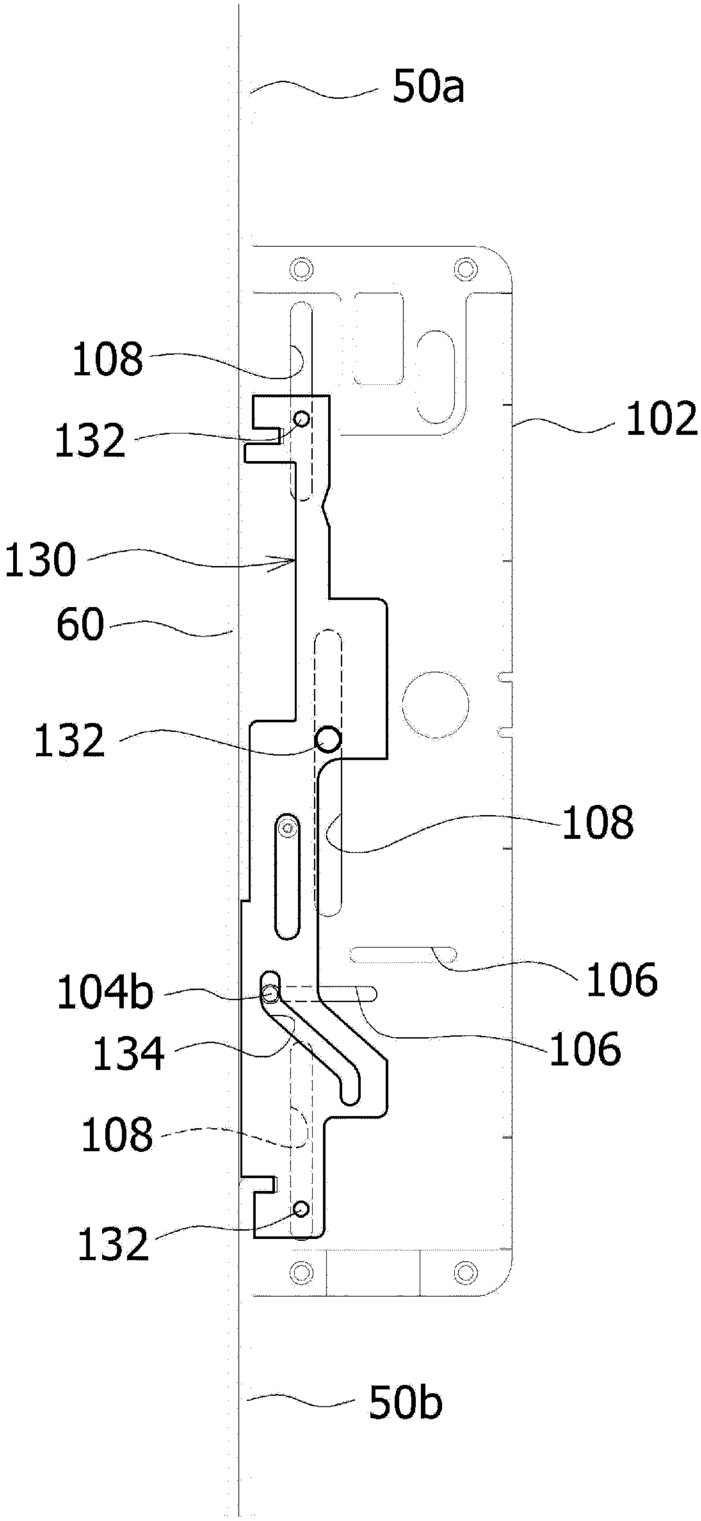
FIG. 4 is a schematic view highlighting a link plate in thick line and most of other parts removed for clarifying the principle of the link plate.

The movement of the deadbolt 104 occurs in association with the movement of the link plate 130 in the direction of the long axis of the face plate 60. FIG. 4 highlights the link plate 130 in thick line and most of other parts removed for clarifying the principle of the link plate 130. The link plate 130 is slidable with respect to the casing 102 in the direction of the long axis of the face plate 60. For this purpose, one or more pairs of guide grooves 108 and pins 132 are provided. These guide grooves 108 extend in the direction of the long axis of the face plate 60. The upper end of the link plate 130 may be connected to the lower end of the first connecting rod 50*a*. The lower end of the link plate 130 may be connected to the upper end of the second connecting rod 50*b*.

Figure 5:
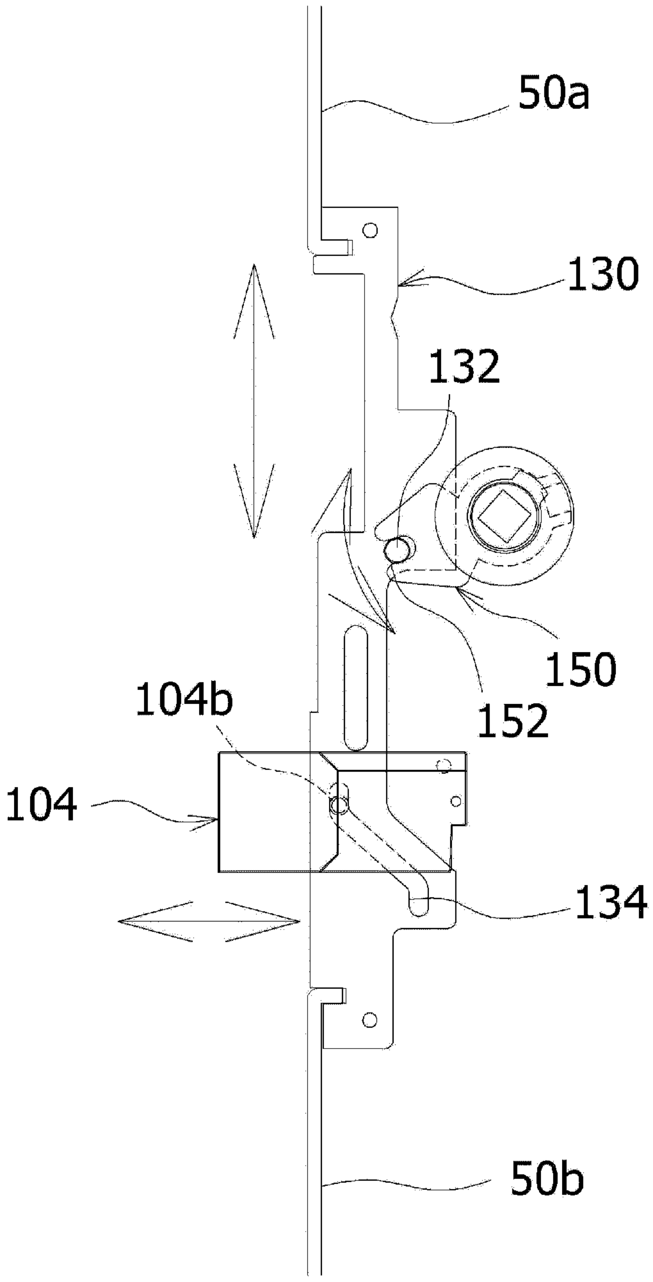
FIG. 5 illustrates how the deadbolt is moved in association with the movement of the link plate of FIG. 4.

A cam groove 134 for receiving a follower pin 104*b* of the deadbolt 104 may be provided in the link plate 130, so that the deadbolt 104 moves forward and backward in association with the movement of the link plate 130 in the direction of the long axis of the face plate 60. The cam groove 134 extends obliquely with respect to the direction of the long axis of the face plate 60. The follower pin 104*b* may also be received in one of the guide grooves 106 of the casing 102 that extends in the direction perpendicular to the long axis of the face plate 60. The cam groove 134 and the follower pin 104*b* convert the movement of the link plate 130 in the first direction into the movement of the deadbolt 104 in the second direction perpendicular to the first direction. FIG. 5 shows how the deadbolt 104 moves forward and backward in the second direction (lateral direction in the figure) as the link plate 130 moves in the first direction (vertical direction in the figure).

The link plate 130 may be driven by at least operation of the operation part 150. The operation part 150 may be configured to move in association with the movement of the door handle or the like. Preferably, the operation part 150 may be fitted to a spindle (not shown) of the door handle or the like. The operation part 150 may include a radial groove 152. The link plate 130 may include a pin 132 which is received in the radial groove 152. Accordingly, when the operation part 150 rotates by lifting or lowering the door handle, the rotation is converted into a linear movement of the link plate 130 by engagement of the radial groove 152 and the pin 132. The operation part 150 may move independently of a transmission plate 172 (FIG. 3) that drives the latch assembly 170.

Figure 6:
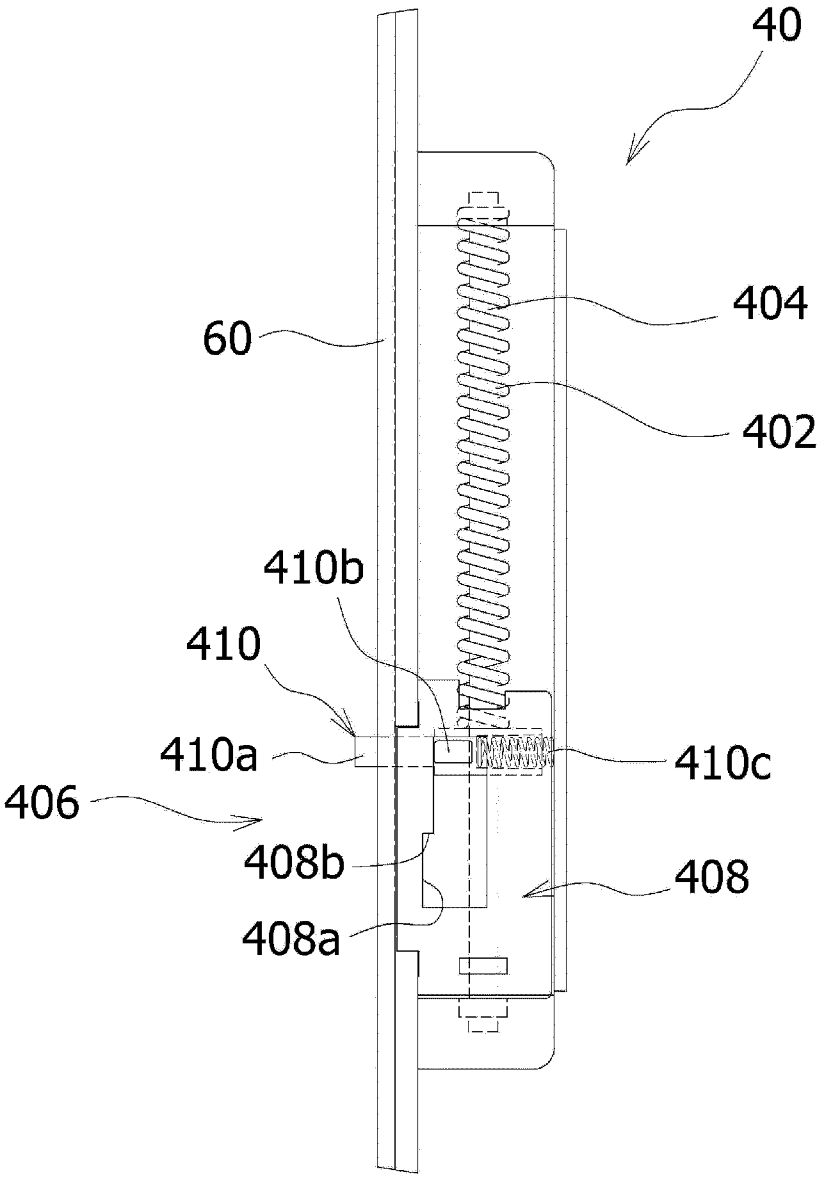
FIG. 6 is an enlarged view of a mechanical power accumulating unit as encompassed by circle B in FIG. 1.

Referring to FIG. 6, the detail of the mechanical power accumulating unit 40 can be seen. The mechanical power accumulating unit 40 is provided for moving, or at least assisting movement of, the link plate 130 so that the deadbolt 104 is automatically moved in association with the movement of the link plate 130. The mechanical power accumulating unit 40 does not require electric power. Instead, the mechanical power accumulating unit 40 may temporarily accumulate energy from the force or torque generated by a user's operation of the door handle or the like and release it when activated. A spring 402 may be provided for that purpose. The spring 402 is preferably a compression coil spring. The axis of the coil spring 402 may be arranged in the direction of the long axis of the face plate 60. The coil spring 402 may be guided by a guide shaft 404. Alternatively, or additionally, a pair of repelling magnets may be used for accumulating the force.

The mechanical power accumulating unit 40 may further include a holding mechanism 406 that releasably holds the spring 402 in a compressed state after the spring 402 has been compressed to accumulate the energy generated by operation of the operation part 150. The holding mechanism 406 may include a connecting plate 408 that directly, or indirectly, connects the spring 402 to the link plate 130, and a strike pin 410 that engages the connecting plate 408 to hold the compressed state of the spring 402. More specifically, the connecting plate 408 is arranged in the casing of the mechanical power accumulating unit 40 so as to be movable in the direction of the long axis of the face plate 60. The connecting plate 408 has an opening 408*a* with a step 408*b* on its edge near the face plate 60. The strike pin 410 includes a main body 410*a*, a protrusion 410*b* located in the opening 408*a*, and a spring 410*c* for pressing the protrusion 410*b* against the edge of the opening 408.

Figure 7:
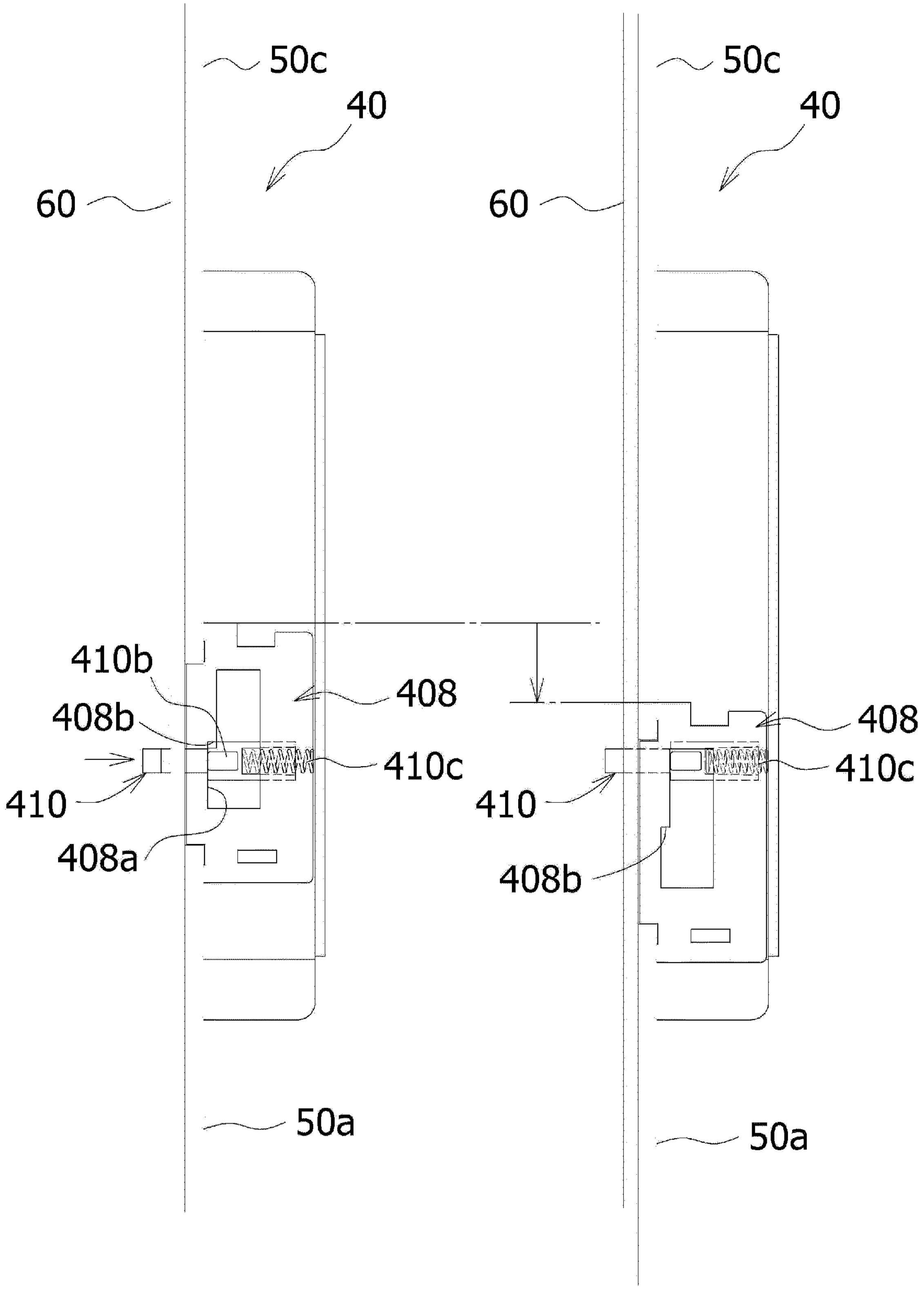
FIG. 7 is a schematic view illustrating the operation of the mechanical power accumulating unit in FIG. 6.

Referring to FIG. 7, operation of the mechanical power accumulating unit 40 is illustrated. The spring 402 and the guide shaft 404 are not shown for the reason of simplicity. In the left-hand figure, the connecting plate 408 is lifted by operation of the operation part 150 to open the door against the spring 402. The spring 402 becomes compressed and accumulates the force. The protrusion 410*b* of the strike pin 410 then engages with the step 408*b* of the connecting plate 408 to hold the compressed state. The tip of the strike pin 410 projects from the face plate 60 by a large amount.

The right-hand figure shows the state of the mechanical power accumulating unit 40 after the door is closed from the open state in the left figure. When the door leaf is closed, the strike pin 410 is pushed by the door frame against the spring 410*c* (see arrow in the left-hand figure). The engagement of the protrusion 410*b* with the step 408*b* is released. The connecting plate 408 is thus pushed down while releasing the force accumulated within the spring 402. The force of the spring 402 is further transmitted to the link plate 130 via the connecting rod 50*a*, and the link plate 130 is moved. The movement of the link plate 130 advances the deadbolt 104 as described with reference to FIG. 5.

Figure 8:
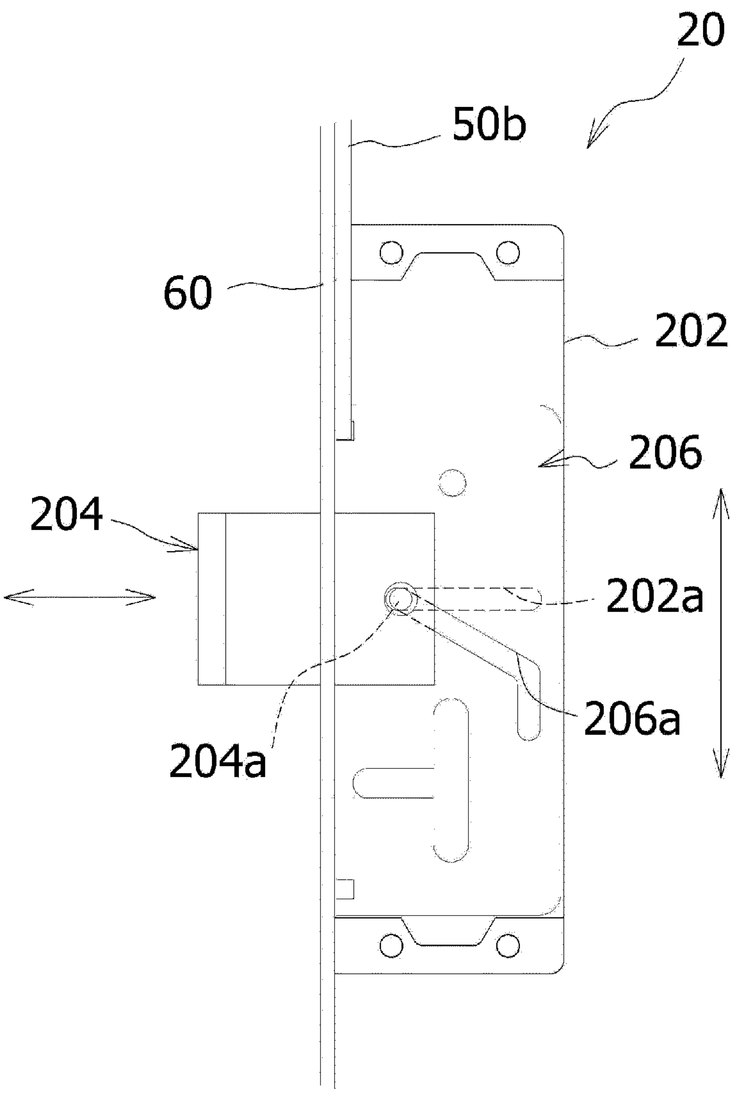
FIG. 8 is an enlarged view of an auxiliary lock as encompassed by circle C in FIG. 1.
Figure 9:
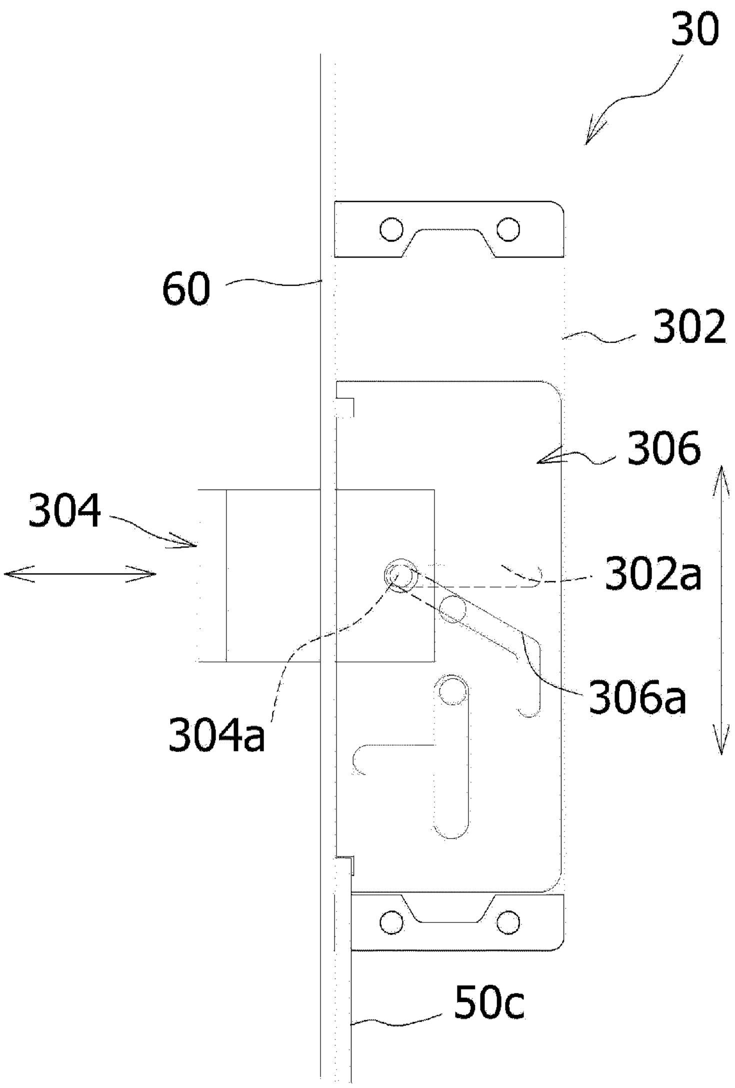
FIG. 9 is an enlarged view of another auxiliary lock as encompassed by circle D in FIG. 1.

FIGS. 8 and 9 illustrate details of the auxiliary locks 20, 30. The auxiliary locks 20, 30 include auxiliary deadlocks 204, 304 and auxiliary link plates 206, 306 to which the connecting rods 50*b*, 50*c* are connected. The auxiliary link plates 206, 306 are provided with cam grooves 206*a*, 306*a* for advancing and retracting the auxiliary deadbolts 204, 304 in association with the movement of the auxiliary link plates 204, 304. The auxiliary deadbolts 204, 304 include follower pins 204*a*, 304*a* received in the cam grooves 206*a*, 306*a*. The follower pin 204*a*, 304*a* are also received in guide grooves 202*a*, 302*a* formed in the casings 202, 302. As such, when the link plate 130 of the main lock 10 is moved by actuation of the operation unit 150 and/or the mechanical power accumulating unit 40, the auxiliary link plates 206, 306 is also moved in a synchronised manner, and the auxiliary deadbolts 204, 304 are thus advanced or retracted by the engagement of the cam grooves 206*a*, 306*a* and follower pins 204*a*, 304*a*.

Figure 10:
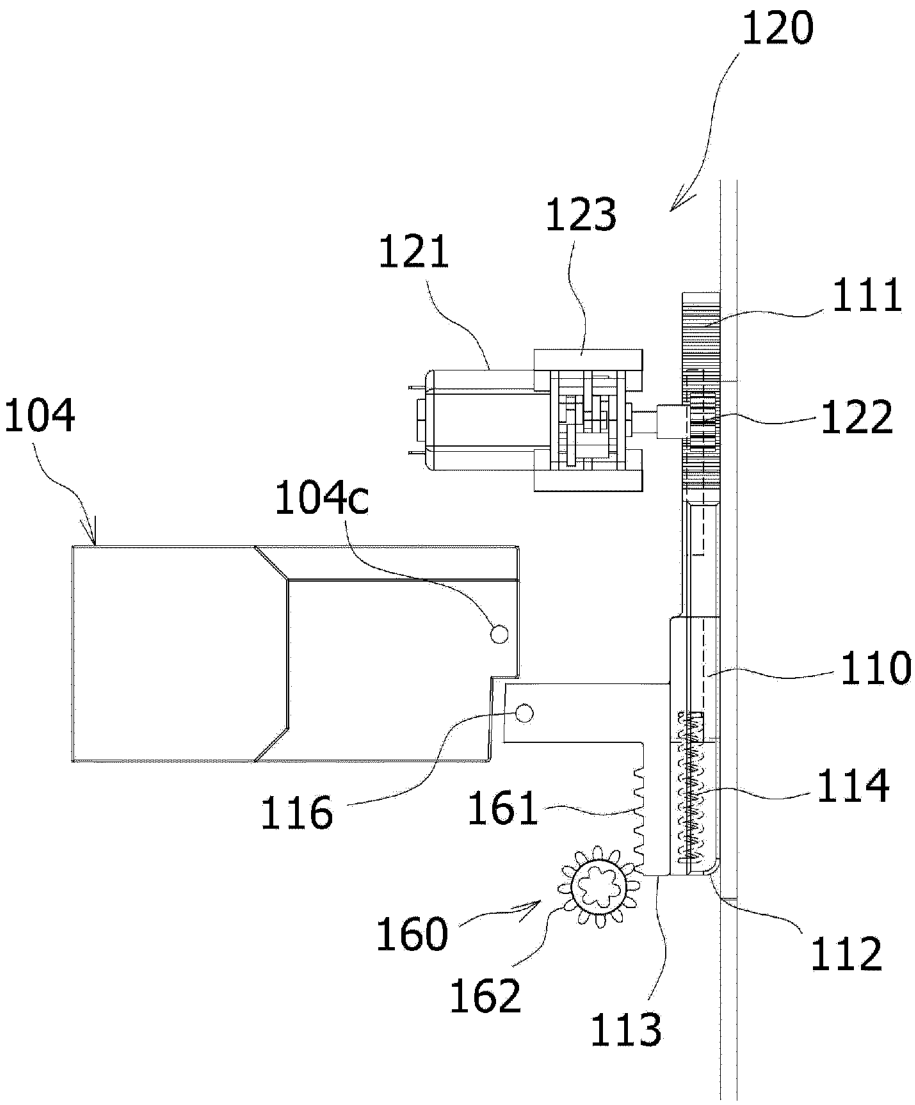
FIG. 10 is a schematic view highlighting a deadbolt blocking member in the main lock and illustrating how it works in association with the deadbolt and a electrically driven actuator unit.

FIG. 10 shows details of the electrically driven actuator unit 120 and of the deadbolt blocking member 110.

The electrically driven actuator unit 120 is provided for displacing the deadbolt blocking member 110 in an electromotive manner to block and unblock the deadbolt 104. The electrically driven actuator unit 120 has an actuator 121 such as an electric motor, a solenoid, or the like. The exemplary actuator uses a DC motor. The actuation of the actuator 121 is controlled by the control circuit as described later.

The electrically driven actuator unit 120 further includes a pinion 122 rotationally driven by the actuator 121. The pinion 122 interacts with a rack 111 formed on the deadbolt blocking member 110. When the pinion 122 is rotated in one direction, the deadbolt blocking member 110 is moved toward a location immediately behind the deadbolt 104. When the pinion 122 is rotated in the reverse direction, the deadbolt blocking member 110 is moved away from the deadbolt 104.

Preferably, the electrically driven actuator unit 120 further includes a reduction gearbox 123 between the output shaft of the motor 121 and the pinon 122. The ratio of the reduction gearbox 123 is designed to be high enough so that, once the deadbolt blocking member 110 is displaced between the blocking position and the unblocking position by actuation of the motor 121 and then the motor 121 is switched off, the deadbolt blocking member 110 remains in the same place against gravity or other forces. The gearbox 123 can also amplify the motor torque by conversion of speed into torque.

Figure 11A:
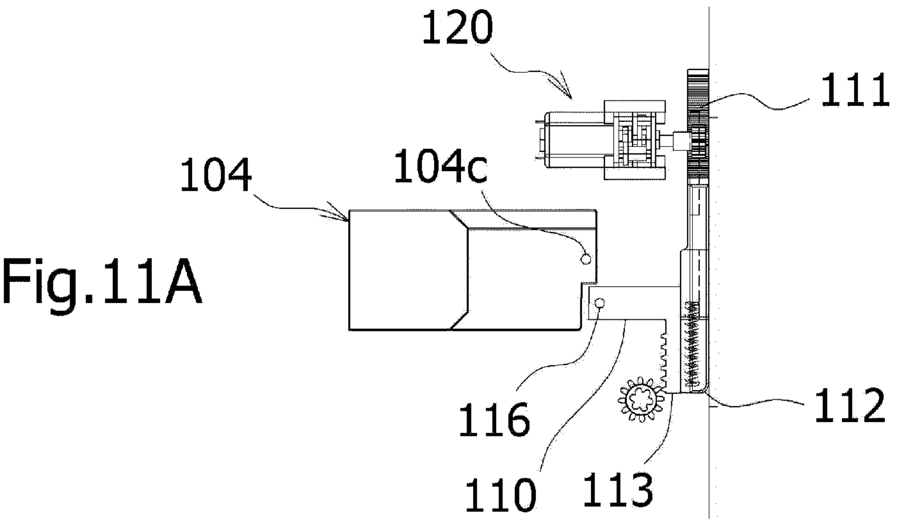
FIGS. 11A-11C show a series of movements of the deadbolt blocking member by actuation of the electrically driven actuator unit.
Figure 11B:
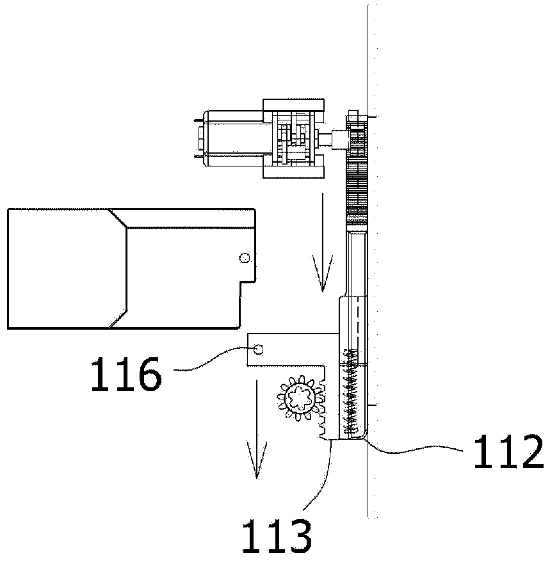
Figure 11C:
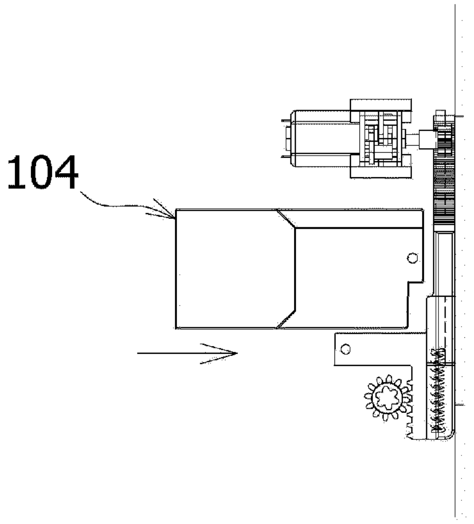

The deadbolt blocking member 110 in a preferred embodiment includes a first slider 112 movable by actuation of the electrically driven actuator unit 120 and a second slider 113 slidably attached to the first slider 112. The deadbolt blocking member 110 may further include a biasing member 114, such as a spring, that applies a biasing force between the first slider 112 and the second slider 113 so that the second slider 113 moves to the blocking position together with the first slider 112 when actuated by the electrically driven actuator unit 120. This operation is shown in relation to FIGS. 11A to 11C. In FIG. 11A, the deadbolt blocking member 110 is in the blocking position, blocking the retreat movement of the deadbolt 104. In FIG. 11B, the deadbolt blocking member 110 is moved toward the unblocking position by actuation of the electrically driven actuator unit 120. During this operation, the first slider 112 and the second slider 113 move together via the biasing force of the biasing means 114. In FIG. 11C, the deadbolt blocking member 110 is in the unblocking position, allowing the deadbolt 104 to be retreated. The blocking operation of the deadbolt 104 can be made by the reverse operation.

In connection with the deadbolt blocking member 110, the locking device 1 may further include a manual override mechanism 160 for manually moving the second slider 113 with respect to, i.e., independently of, the first slider 112 to the unblocking position against the biasing force of the biasing member 114. This is particularly in the event of an emergency, or when the electrically driven actuator unit 120 cannot be activated due to a power loss, failure, or the like.

Figure 12A:
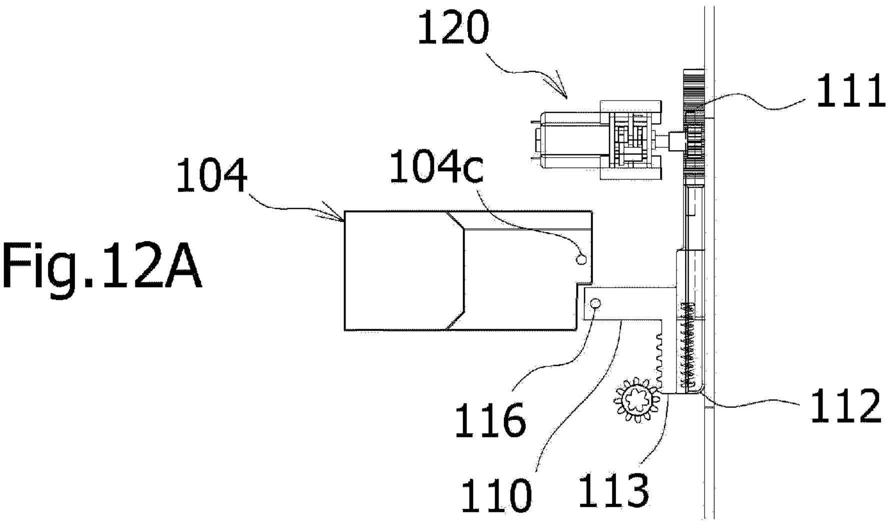
FIGS. 12A-12C show a series of movements of a second slider of the deadbolt blocking member with respect to a first slider of the deadbolt blocking member by operation of a manual override mechanism.
Figure 12B:
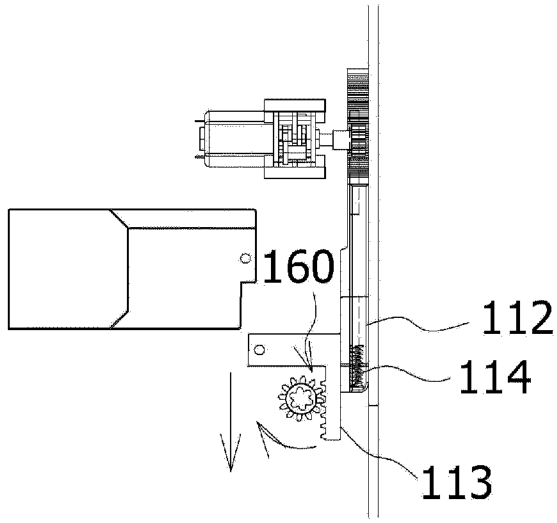
Figure 12C:
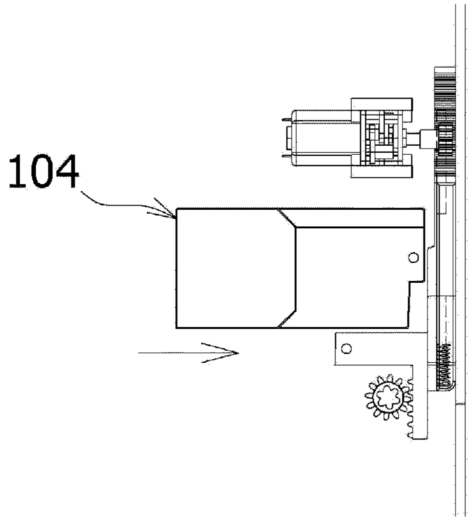

As shown in FIG. 10, the manual override mechanism 160 may include a rack 161 formed on the second slider 113, and a pinion 162 which is driven by a manual operation key (physical key) and which engages with the rack 161 to move the second slider 113 with respect to the first slider 112 against the biasing member 114. The pinion 162 may be connected to a typical key cylinder such as Euro cylinder. Preferably, the pinion 162 is configured to be operated from the indoor side. In addition thereto, the pinion 162 may also be configured to be operated from the outdoor side. The operation of the manual override mechanism is shown in relation to FIGS. 12A to 12C. In FIG. 12A, the deadbolt blocking member 110 is in the blocking position, blocking the retreat movement of the deadbolt 104. In FIG. 12B, only the second slider 113 is moved with respect to, i.e., independently of, the first slider 112 against the biasing means 114 toward the unblocking position, by actuation of the manual override mechanism 160. The first slider 112 as well as the electrically driven actuator unit 120 are not activated. In FIG. 12C, only the second slider 113 is in the unblocking position, thus allowing the deadbolt 104 to be retreated.

In the operation of the manual override mechanism 160, the second slider 113 therefore can move with respect to the first slider 112 in an isolated manner, allowing a means of activating the manual override mechanism 160 without transmitting torque to the electrically driven actuator unit 120. This ensures that the manual override mechanism 160 can be easily operated with less human power.

Figure 13:
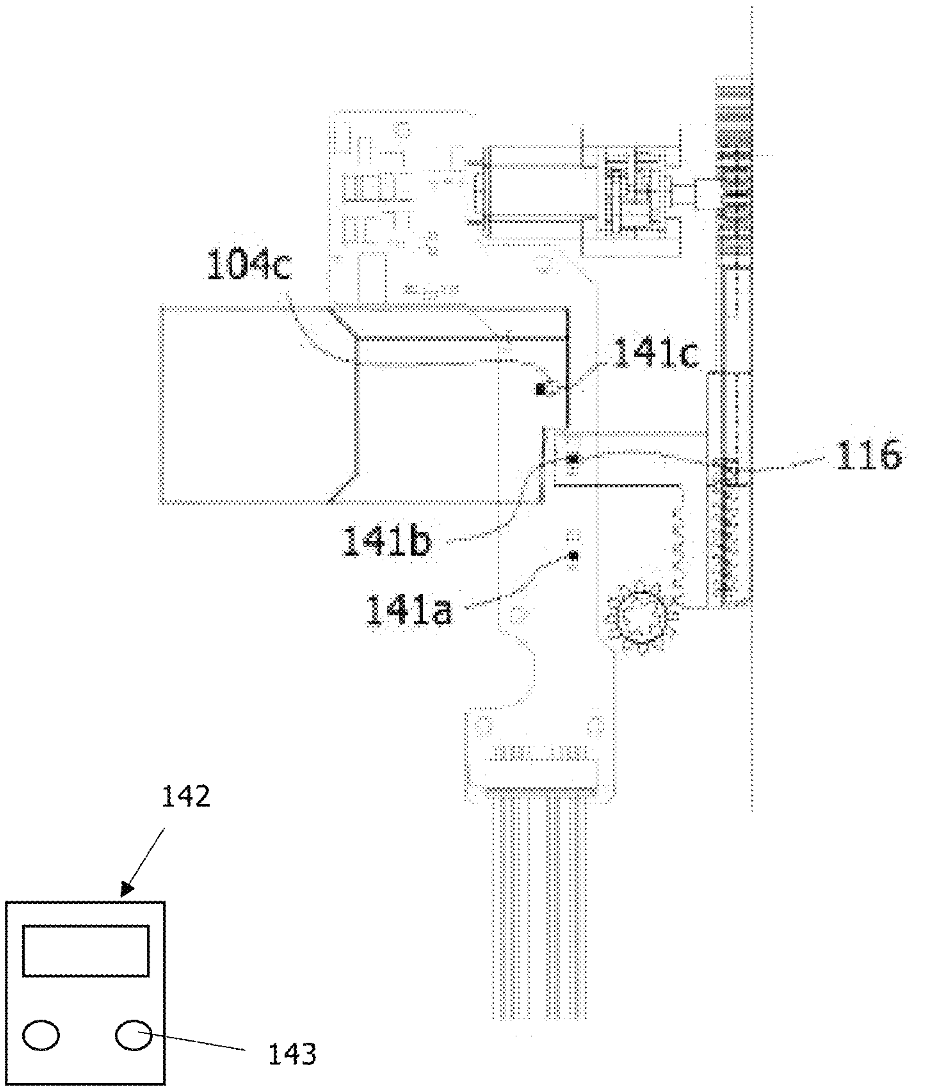
FIG. 13 is a schematic view illustrating the positional relationship of Hall effect sensors within a printed circuit board with respect to the deadbolt blocking member and the deadbolt.

With reference to FIG. 13, advantageous features are shown, that can be combined with any or all of the features described above. The locking device 1 may further include a first detector 141*c* which is configured to detect whether the deadbolt 104 is in the advanced position, thus allowing the deadbolt blocking member 110 to move to the blocking position. In such a case, the control circuit in the PCB 140 is configured to move the deadbolt blocking member 110 by actuation of the electrically driven actuator unit 120 when the first detector 141*c* detects the deadbolt 104 is in the advanced positon. The door handle operation, or the actuation of the mechanical power accumulating unit 160, triggers the electrically driven actuator unit 120 to move the deadbolt blocking member 110 toward the blocking position. According to this configuration, the blocking of the deadbolt 104 is automatically performed upon the detection by the first detector 104*c*. In addition, wrong blocking operation is prevented. More specifically, if the deadbolt blocking member 110 is moved to the blocking position in spite of the deadbolt 104 being in the retracted position, the electrically driven actuator unit 120 may be overloaded and generate heat. Such a scenario is prevented by the control circuit associated with the first detector 141*c*.

Preferably, the locking device 1 further includes a second detector 141*b* which is configured to detect whether the deadbolt blocking member 110 is in the blocking position. In such a case, the control circuit is configured to stop actuation of the electrically driven actuator unit 120 after moving the deadbolt blocking member 110 from the unblocking position to the blocking position. According to this configuration, overload of the electrically driven actuator unit 120 after moving the deadbolt blocking member 110 from the unblocking position to the blocking position is prevented by the control circuit associated with the second detector 141*b*.

Preferably, the locking device 1 further includes a third detector 141*a* which is configured to detect whether the deadbolt blocking member 110 is in the unblocking position. In such a case, the control circuit is configured to stop actuation of the electrically driven actuator unit 120 after moving the deadbolt blocking member 110 from the blocking position to the unblocking position. According to this configuration, overload of the electrically driven actuator unit 120 after moving the deadbolt blocking member 110 from the blocking position to the unblocking position is prevented by the control circuit associated with the third detector 141*a*.

It is more preferable that at least one of these detectors 141*a* to 141*c* is a non-contact sensor. Examples of the non-contact sensor include a proximity sensor such as a Hall effect sensor or an electrostatic capacitance sensor, and a photoelectric sensor. A Hall effect sensor is preferred, as it does not deteriorate with dust, oil, lock shavings, etc. Also, Hall effect sensors are accurate, sensitive and function with accurate position measurement over a long period of time. A Hall effect sensor is therefore the most suitable for use within the locking device 1, among other non-contact sensors. The detector is not however limited to the non-contact sensor. The detector may be a mechanical sensor such as a limit switch or a microswitch.

In the case where each detector 141*a*, 141*b*, 141*c* is the Hall effect sensor, a respective magnet 116, 104*c* to be detected by the Hall effect sensor is arranged in the deadbolt blocking member 110 and the deadbolt 104 so as to face the Hall effect sensor in the respected position to be detected.

The control circuit in the PCB 140 may include a suitable controller or microprocessor to control the actuation of the electrically driven actuator unit 120 upon operation of an operation pad 142 which may be mounted on the door leaf to be operated by a user, and/or upon operation of one or more user's devices such as remote controllers and smart phones. The control circuit may further include a communication unit to communicate with the user's device or the like via a suitable communication interface.

The control circuit may further include one or more memory units, such as RAM, for storing the controller's instructions or the like.

The "user's device" means a device owned by any person who is authorised to access a room or place secured by a locking device according to the invention. Therefore, not only a user or a resident of the secured place, but also one or more persons, e.g., laundry and cleaning services, authorised by the user or the residence of the secured place or by administrative authority, or the like, may have one or more user's device.

Examples of such a user's device are a mobile phone, smart phone, tablet, fob or remote control, or other smart home devices such as Amazon Alexa® or Google Assistant®. Any secured wireless communication technology, such as Bluetooth®, Wi-Fi, Z-wave, Radio Frequency Identification (RFID), or cellular broadband service may be used to communicate between the communication interface and the one or more user's devices.

The control circuit may be fed with power from a battery. The battery may be a rechargeable battery and arranged inside the casing 102 of the main lock 10. The battery may be charged in a contactless manner by means of electromagnetic induction. To this end, a primary or transmitting induction coil may be arranged in or on the door frame, and a secondary or receiving induction coil connected to the rechargeable battery via the control circuit may be arranged in or on the front plate 60 of the locking device 1, so as to face the primary coil, so that the battery is charged while the door is closed. The control circuit may be configured to detect the residual capacity of the battery and send the information thereof to one or more user's device or the like if needed.

Hereinafter, a particular example of the locking and unlocking operations of the locking device 1 will be described. In FIG. 1, the door is closed, and the dead bolts 104, 204, 304 are in the advanced position, each engaging a corresponding cavity formed in the door frame. The locking device 1, and consequently the door, is thus in a so-called "locked" state. The deadbolt blocking member 110 is in the location immediately behind the deadbolt 104, blocking the retreat movement of the deadbolt 104 (FIG. 11A). The door is thus locked and secured.

A user now operates a user device or the operation pad on the door leaf or the lock housing to unlock the door. To this end, the user may push the two separated buttons 143 on the operation pad, to have the control circuit actuate the electrically driven actuator unit 120 to move the deadbolt blocking member 110 to the unlocking position (FIG. 11B). This is by way of example only, any form of signalling to the locking device 1 can be conceived to cause the control circuit to actuate the electrically driven actuator unit 120. Examples include the use of a Bluetooth® connected device, a WiFi connected device, physical buttons located on the door, the door frame or the locking device 1 itself. The actuation of the electrically driven actuator unit 120 is stopped when the third detector 141*a* detects that the deadbolt blocking member 110 is in the unblocking positon. The user then can lift or lower the door handle to rotate the operation part 150 and thus to generate the upward movement of the link plate 130. The upward movement of the link plate 130 not only leads to the retreat movement of the deadbolt 104 (FIG. 11*c*), but also generates the upward movement of the connecting plate 408 of the accumulating unit 40 via the first connecting rod 50*a* against the spring 402 to accumulate the mechanical energy within the spring 402 with the aid of the holding mechanism 406 (left image in FIG. 7). The locking device 1, and consequently the door, is now in an "unlocked" state, meaning that the user can open the door as desired.

Once the door has been unlocked and opened as above, the locking device 1 will be in the unlocked state, such that the dead bolts 104, 204, 304 are each held within the door body. From this configuration, when the user closes the door, the strike pin 410 of the mechanical power accumulating unit 40 is pushed by the door frame against the spring 410*c*, releasing the accumulated energy to power a downward movement of the link plate 30. The downward movement of the link plate 30 generates forward movement of the deadbolt 104 via the engagement of the cam groove 134 in the link plate 30 and the follower pin 104*b* of the deadbolt 104 (FIG. 5). When the first detector 141*c* detects that the deadbolt 104 is successfully moved to the advanced position, the control circuit controls the electrically driven actuator unit 120 to move the deadbolt blocking member 110 to the blocking positon (FIG. 11). The door is thus automatically locked and movement of the mechanism controlling the dead bolts 104, 204, 304 is blocked. The arrival of the deadbolt blocking member 110 at the blocking position is detected by the second detector 141*b*, causing the control circuit to stop the actuation of the electrically driven actuator unit 120.

In the event of an emergency, or when the electrically driven actuator unit 120 cannot be activated due to a power loss, failure, or the like, the user can manually unlock the door by operation of the manual override mechanism 160. When the locking device 1 is in the locked state above and as shown in FIG. 1, the user can move the second slider 113 of the deadbolt blocking member 110 with respect to the first slider 112, against the biasing means 114, to the unblocking position; this is achieved by rotating the pinion 162 of the manual override mechanism 160 with the manual operation key or physical key (FIGS. 12A and 12B) from indoor side and/or outdoor side. While holding the manual operation key in place, the user can lift or lower the door handle to retract the deadbolt 104 and to accumulate the mechanical power within in the mechanical power accumulating unit 40. It is also conceivable that there is enough friction in the manual override mechanism 160 to hold the manual operation key in a location which counters the biasing means 114, thus meaning that the second slider 113 of the deadbolt blocking member 110 remains in the unblocked orientation. The user now can open the door. When the door is closed again, the mechanical power accumulating unit 40 is activated in the manner described above to automatically lock the door again.

Whilst the present invention has been illustrated by the description of example locking device, the Applicant does not intend to restrict or in any way limit the scope of the appended claims to such detail. Additional modification will also readily appear to those skilled in the art. The Applicant does not intend to restrict or in any way limit the scope of the appended claims to that the locking device is supplied with a door and thus all electronics are well hidden. The locking device of the present invention may be an after-sales lock—and the electronics are prepared for the user/door or lock fitter to integrate.

Further although the above-description describes the locking device being used in a door, it is conceivable that the locking device may be used in other types of closures, such as windows, gates, shutters, or the like.

LIST OF REFERENCE NUMERALS

1 Locking device
10 Main lock
20, 30 Auxiliary lock
40 Mechanical power accumulating unit
50*a*-50*c* Connecting rod
60 Face plate
104 Deadbolt
  104*b* Follower pin
  104*c* Magnet
110 Deadbolt blocking member
  111 Rack
  112 First slider
  113 Second slider
120 Electrically driven actuator unit
  121 Actuator (electric motor)
  122 Pinion
  123 Gearbox
130 Link plate
  132 Pin
  134 Cam groove
140 Printed circuit board
  141*a*-141*c* Hall effect sensor
150 Operation part
  152 Radial groove
160 Manual override mechanism
  161 Rack
  162 Pinion
170 Latch assembly

The invention claimed is:

1. A locking device having a deadbolt within a casing which deadbolt is movable between an advanced position wherein it protrudes from a front face of the casing and a retreated position wherein it is retracted into the casing, comprising:

a link plate which moves the deadbolt to the advanced position;

a deadbolt blocking member which is moveable between a blocking position blocking the deadbolt in the advanced position and an unblocking position to allow the deadbolt to move to the retreated position;

an electrically driven actuator unit which moves the deadbolt blocking member between the blocking position and the unblocking position; and a control circuit configured to control the electrically driven actuator unit so that once the deadbolt is moved to the advanced position, the deadbolt blocking member is moved to the blocking position by actuation of the electrically driven actuator unit;

the locking device further comprising a first detector which is configured to detect whether the deadbolt is in the advanced position, wherein the control circuit is configured to move the deadbolt blocking member by actuation of the electrically driven actuator unit when the first detector detects the deadbolt is in the advanced position, wherein the deadbolt blocking member does not contact the deadbolt when it moves to block the deadbolt.

2. The locking device according to claim 1, further comprising a second detector which is configured to detect whether the deadbolt blocking member is in the blocking position, wherein the control circuit is configured to stop actuation of the electrically driven actuator unit after moving the deadbolt blocking member from the unblocking position to the blocking position.

3. The locking device according to claim 1, further comprising a third detector which is configured to detect whether the deadbolt blocking member is in the unblocking position, wherein the control circuit is configured to stop actuation of the electrically driven actuator unit after moving the deadbolt blocking member from the blocking position to the unblocking position.

4. The locking device according to claim 1, wherein the first detector is a non-contact sensor.

5. The locking device according to claim 4, wherein the non-contact sensor is a Hall effect sensor.

6. The locking device according to claim 1, further comprising a mechanical power accumulating unit which accumulates energy and releases a force to move the link plate so that the deadbolt is moved in association with the movement of the link plate.

7. The locking device according to claim 6, wherein the mechanical power accumulating unit includes a spring which directly, or indirectly, provides the force for moving the deadbolt to the advanced position.

8. The locking device according to claim 7, wherein the mechanical power accumulating unit includes a holding mechanism that releasably holds the spring in a compressed state after the spring has been compressed.

9. The locking device according to claim 8, wherein the holding mechanism includes a connecting plate that directly or indirectly connects the spring to the link plate, and a strike pin that engages the connecting plate to hold the spring in its compressed state, wherein the strike pin is movable out of engagement with the connecting plate so that the mechanical power accumulating unit directly or indirectly moves the link plate.

10. The locking device according to claim 6, wherein the link plate is configured to convert the force released from the mechanical power accumulating unit into the advancing movement of the deadbolt to the advanced position.

11. The locking device according to claim 6, further comprising an operation part that moves the link plate against the mechanical power accumulating unit to accumulate the force.

12. The locking device according to claim 1, wherein in the blocking position the deadbolt blocking member is positioned immediately behind the deadbolt but with a gap therebetween.

13. The locking device according to claim 1, wherein the deadbolt blocking member includes:

a first slider moveable by actuation of the electrically driven actuator unit;

a second slider slidably mounted on the first slider;

a biasing member that applies a biasing force between the first slider and the second slider to move the second slider to the blocking position together with the first slider during actuation of the electrically driven actuator unit; and a manual override mechanism to move the second slider with respect to the first slider to the unblocking position against the biasing force of the biasing member.

14. The locking device according to claim 13, wherein the manual override mechanism includes a rack, which is formed on the second slider and a pinion, which is driven with a manual operation key by a user and engages with the rack to move the second slider with respect to the first slider.

15. The locking device according to claim 1, further comprising:

a rechargeable battery configured to provide electrical power to the control circuit; and an inductive coil coupled to the rechargeable battery, the inductive coil being configured to wirelessly receive power from an external device that is positioned proximate to the locking device.

16. The locking device according to claim 15, wherein the inductive coil is positioned on or in a face plate of the locking device.

17. The locking device according to claim 1, further comprising an operation pad connected to the control circuit by a wireless or wired channel and including at least two separated buttons, wherein the control circuit is configured to actuate the electrically driven actuator unit to move the deadbolt blocking member to the unlocking position when the at least two buttons are pressed simultaneously.

18. The locking device according to claim 1, which is a multi-point locking device comprising one or more auxiliary locks at multiple points.

* * * * *